United States Patent [19]
Matsuura et al.

[11] Patent Number: 5,519,634
[45] Date of Patent: May 21, 1996

[54] DATA TRANSFER UNIT AND METHOD OF POWER SUPPLY TO THE DATA TRANSFER UNIT

[75] Inventors: Kosei Matsuura, Kasugai; Takashi Ishidoshiro; Chikai Tsuzuki, both of Nagoya, all, Japan

[73] Assignee: Melco Inc., Nagoya, Japan

[21] Appl. No.: 258,974

[22] Filed: Jun. 10, 1994

[51] Int. Cl.⁶ .................................................. H02J 4/00
[52] U.S. Cl. .................................... 364/492; 323/371
[58] Field of Search ............. 323/371; 364/483, 364/492

[56] References Cited

U.S. PATENT DOCUMENTS

| | | | |
|---|---|---|---|
| 4,607,170 | 8/1986 | Wickman | 307/147 |
| 4,630,198 | 12/1986 | I-Yuan | 364/200 |
| 4,884,287 | 11/1989 | Jones et al. | 375/121 |
| 4,901,217 | 2/1990 | Wilson | 363/126 |
| 5,032,742 | 7/1991 | Zanders | 361/91 X |
| 5,313,642 | 5/1994 | Seigel | 395/75 |
| 5,402,015 | 3/1995 | Hammermann | 326/75 |
| 5,438,678 | 8/1995 | Smith | 395/750 |

FOREIGN PATENT DOCUMENTS
2-34069 2/1990 Japan.

*Primary Examiner*—Edward R. Cosimano
*Attorney, Agent, or Firm*—Hickman & Beyer

[57] ABSTRACT

The present invention provides a data transfer unit interposed between a computer and a peripheral device for executing data exchange by a handshaking process based on a signal level. The invention also provides a method of supplying power to the data transfer unit. The data transfer unit includes a first power circuit and a second power circuit. The first power circuit receives an electric current via a diode D6 connected in a forward direction to a signal line RTS used for handshaking and generates a predetermined positive voltage of +12 volts. The second power circuit receives an electric current via a diode D1 connected in a reverse direction to the signal line RTS used for handshaking and generates the predetermined positive voltage of +12 volts. An auxiliary power of −12 volts is supplied from a data output signal line TXD in a printer. A voltage regulator (23) receives the output of the predetermined positive voltage and generates a steady voltage of +5 volts, which is supplied as power of a logic circuit.

25 Claims, 5 Drawing Sheets

DATA TRANSFER UNIT AND METHOD OF POWER SUPPLY TO THE DATA TRANSFER UNIT

BACKGROUND OF THE INVENTION

1. Field of the Invention

The present invention relates to a data transfer unit, and more specifically to a data transfer unit interposed between devices for executing data exchange by a handshaking process based on a signal level. The invention also pertains to a method of supplying power to the data transfer unit.

2. Description of the Related Art

Known data transfer units include one interposed between a personal computer and a peripheral device such as a printer for conversion of parallel data to serial data or vice versa and one connecting a plurality of devices by a daisy chain for serial data communications.

Data conversion and transmission requires power of a predetermined voltage for activating general purpose synchronous/non-synchronous transmission ICs (for example, UART) and other logic circuits or for driving line drivers and receivers. The required power is generated in a power supply circuit incorporated in a data transfer unit, which includes a battery or is connected to a commercial power source.

In a general structure, the data transfer unit as well as communication devices connected to the data transfer unit receive power from the commercial power source, thus requiring many receptacles. The conventional data transfer unit requiring an outlet for the commercial power source can not be placed at an arbitrary position even when a computer and a printer are driven by an internal battery. The data transfer unit having an internal battery has other problems; that is, consuming labor and time for charging and replacing the battery, and making the data transfer unit undesirably bulky.

SUMMARY OF THE INVENTION

The object of the invention is accordingly to provide a data transfer unit which works without a commercial power source or a battery.

The present invention is directed to a first data transfer unit interposed between two devices for executing data exchange according to a handshaking process based on a signal level. The first data transfer unit includes: a first power circuit for receiving an electric current via a rectifier connected in a forward direction to a signal line used for handshaking, and generating a predetermined positive voltage; a second power circuit for receiving an electric current via a rectifier connected in a reverse direction to the signal line used for handshaking, and generating the predetermined positive voltage; and power supply means for supplying outputs of the first power circuit and the second power circuit as power of a logic circuit.

The data transfer unit of the invention includes the first power circuit and the second power circuit. The first power circuit receives an electric current via a rectifier connected in a forward direction to a signal line used for handshaking, and generates a predetermined positive voltage. The second power circuit, on the other hand, receives an electric current via a rectifier connected in a reverse direction to the signal line used for handshaking, and generates the predetermined positive voltage. The power supply means then supplies the predetermined positive voltage as power of a logic circuit.

The invention is also directed to a second data transfer unit interposed between devices for executing data exchange according to a handshaking process based on a signal level. The second data transfer unit includes: a power circuit for receiving an electric current via two or more rectifiers respectively connected in a forward direction to two or more signal lines for two or more signals which are output from the device and not fixed simultaneously at a lower level, and generating a predetermined positive voltage; and power supply means for supplying an output from the power circuit as power of a logic circuit.

In the second data transfer unit of the invention thus constructed, the power circuit receives an electric current via a plurality of rectifiers respectively connected in a forward direction to a plurality of signal lines for a plurality of signals which are output from the device and not fixed simultaneously at a lower level, and generates a predetermined positive voltage. The power supply means then supplies the predetermined positive voltage as power of a logic circuit.

The invention is further directed to a method of supplying power to a data transfer unit, which is interposed between devices for executing data exchange according to a handshaking process based on a signal level. The method includes steps of: receiving an electric current via a rectifier connected in a forward direction to a signal line used for handshaking to generate a predetermined positive voltage; receiving an electric current via a rectifier connected in a reverse direction to the signal line used for handshaking to generate the predetermined positive voltage; and supplying the predetermined positive voltage as power of a logic circuit used for data transmission.

In the method of supplying power to the data transfer unit, a predetermined positive voltage is generated in response to an electric current supplied via a rectifier connected in a forward direction to a signal line used for handshaking. The predetermined positive voltage is further generated in response to an electric current supplied via a rectifier connected in a reverse direction to the signal line used for handshaking. The predetermined positive voltage thus generated is supplied as power of a logic circuit used for data transmission.

The invention also provides another method of supplying power to a data transfer unit, which receives parallel data output from a device of parallel data exchange, converts the parallel data to serial data, and transmits the serial data to a device of serial communications. The method includes steps of: receiving an electric current via a rectifier connected in a forward direction to a signal line output from the device of serial communications to generate a predetermined positive voltage; receiving an electric current via a rectifier connected in a reverse direction to the signal line output from the device of serial communications to generate the predetermined positive voltage; and supplying the predetermined positive voltage as power of a logic circuit used for data conversion and transmission.

According to another aspect, the invention is directed to still another method of supplying power to a data transfer unit, which is interposed between devices for executing data exchange according to a handshaking process based on a signal level. The method includes steps of receiving an electric current via two or more rectifiers respectively connected in a forward direction to two or more signal lines for two or more signals which are output from the plurality of devices and not fixed simultaneously at a lower level to generate a predetermined positive voltage; and supplying the predetermined positive voltage as power of a logic circuit used for data transmission.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
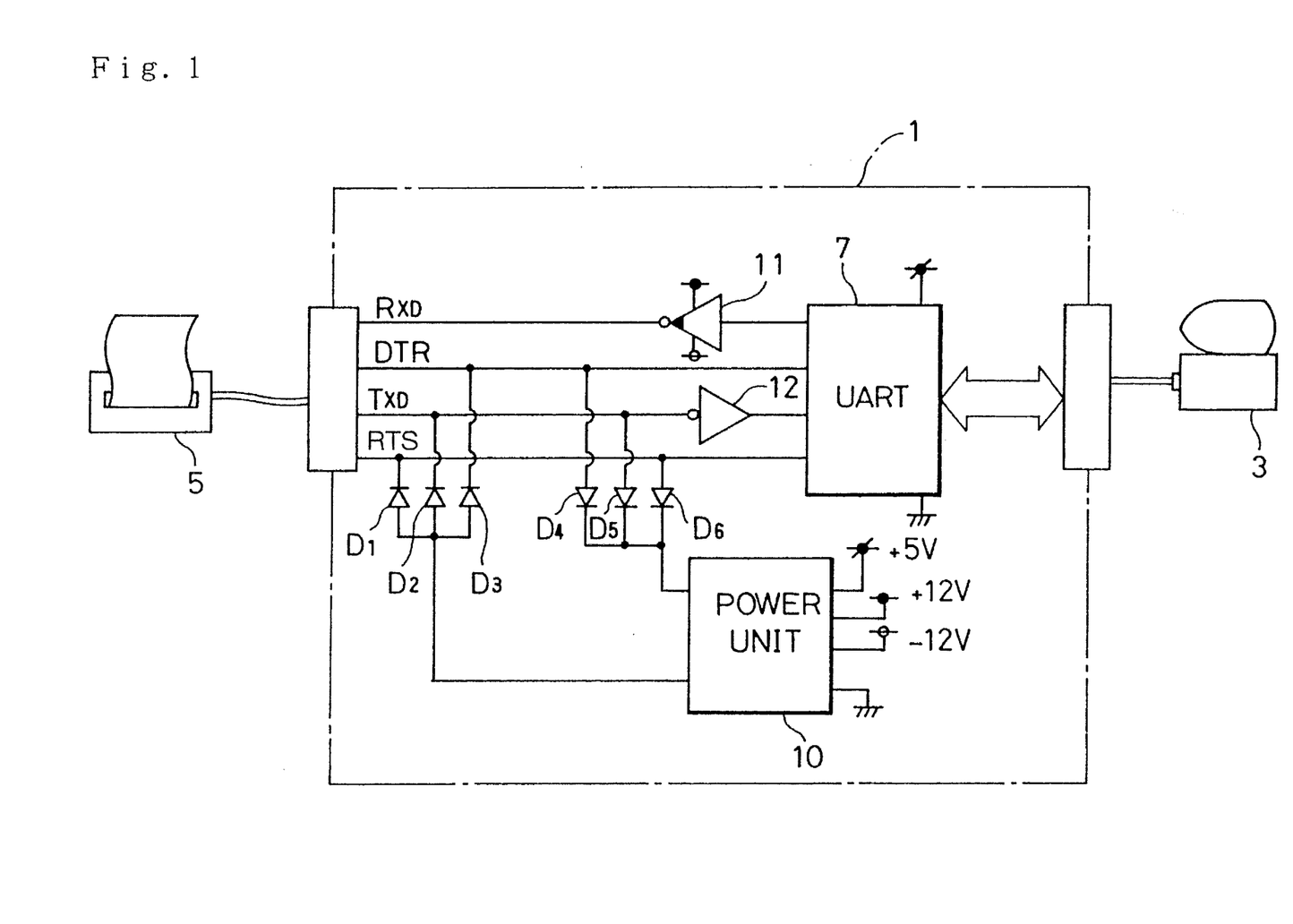
FIG. 1 is a block diagram schematically showing a structure of a data transfer unit embodying the invention.
Figure 2:
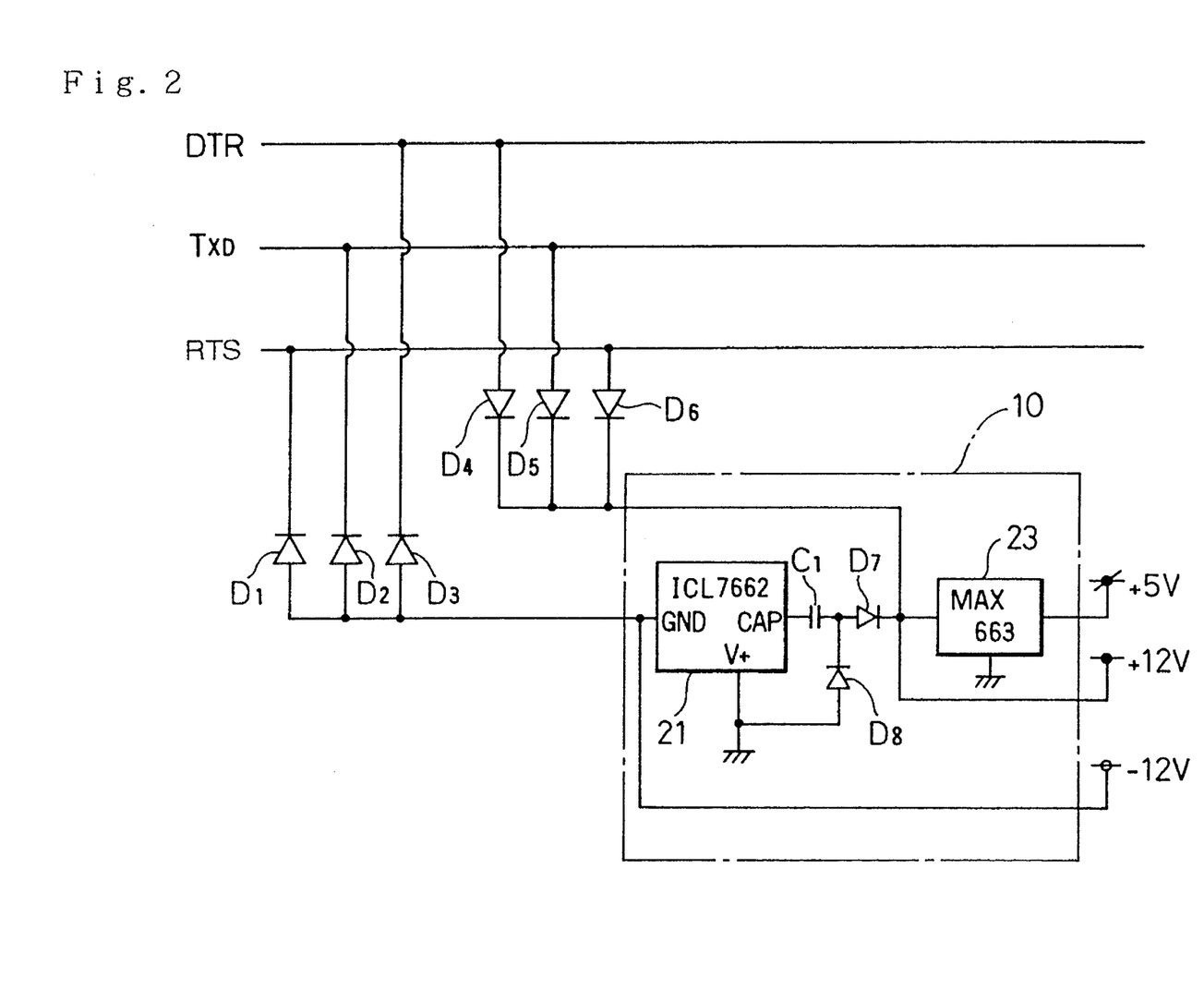
FIG. 2 is a circuit diagram illustrating a typical structure of a power unit included in the data transfer unit of FIG. 1.

FIG. 1 schematically shows a structure of a data transfer unit embodying the invention, and FIG. 2 is a circuit diagram illustrating a typical structure of a power unit included in the data transfer unit of FIG. 1.

Referring to FIG. 1, a data transfer unit 1 interposed between a personal computer 3 and a printer 5 receives parallel data output from the personal computer 3, converts the parallel data to serial signals, and sends the serial signals to the printer 5. Parallel data exchange between the personal computer 3 and the data transfer unit 1 is attained through parallel communications in conformity with a Centronics standard whereas data exchange between the data transfer unit 1 and the printer 5 is implemented through serial communications in conformity with an RS-232C standard.

The data transfer unit 1 includes a communications processor 7 and a power unit 10. The communications processor 7 controls the timing of conversion of parallel data to serial signals and of data exchange with the personal computer 3 for parallel data and with the printer 5 for serial signals. The data transfer unit 1 further includes, other than the communications processor 7, a variety of logic circuits for controlling the timing, which are not illustrated or described here. The communications processor 7 and peripheral circuits require supplying a constant voltage of +5 volts. A line driver 11 for driving an RS-232C signal line requires supplying positive and negative voltages while a CMOS (complementary metal-oxide semiconductor) inverter 12 requires a voltage of +12 volts. These voltages are generated by the power unit 10 described later.

RS-232C communications between the printer 5 and the data transfer unit 1 are implemented under the sequence of handshaking with a data terminal ready signal DTR. In the drawing of FIG. 1, the data transfer unit 1 sends data through a data input signal line RXD while the printer 5 receives data through the data input signal line RXD. The data transfer unit 1 receives data through a data output signal line TXD while the printer 5 sends data through the data output signal line TXD. In the description hereinafter, DTR represents both a data terminal ready signal and a corresponding signal line, and RTS represents both a request-to-send signal and a corresponding signal line.

The line driver 11 is disposed on the data input signal line RXD, and the inverter 12 is placed on the data output signal line TXD. The line driver 11 is connected to a positive/negative power source, which generates positive and negative voltages required for the RS-232C communications. A possible voltage range for the RS-232C standard is ±3 volts through ±25 volts. The data transfer unit 1 of the embodiment is designed to work at voltages of ±12 volts, which are supplied to the line driver 11. In the drawing of FIG. 1, power supply lines for +12 volts and −12 volts are respectively shown by a closed circle and an open circle.

Referring to FIG. 2, the power unit 10 includes a DC-DC converter 21 (model ICL7662 by Harris Corp.), a voltage regulator 23 (model MAX 663 by Maxim Corp.), and peripheral elements. Signal lines RTS, TXD, and DTR of a request-to send signal, a data output signal, and a data terminal ready signal, which are output from the printer 5, are respectively connected to a ground terminal GND of the DC-DC converter 21 via diodes D1, D2, and D3 functioning as rectifiers. A capacitor C1 and a diode D7 are connected in series to a capacitor terminal CAP of the DC-DC converter 21. At a node of the capacitor C1 and the diode D7 is connected another diode DS, which is further connected to a positive voltage input terminal V+ of the grounded DC-DC converter 21.

The DC-DC converter 21 conducts quick switching between connection of the capacitor terminal CAP with the ground terminal GND and connection of the capacitor terminal CAP with the positive voltage input terminal V+. When the capacitor terminal CAP of the DC-DC converter 21 is connected with the ground terminal GND through the switching operation, the reversely oriented (in the direction from GND line to signal line) diode D1, the capacitor C1, and the reversely oriented diode D8 are connected in series to the request-to-send signal line RTS. In a similar manner, the reversely oriented diode D2, the capacitor C1, and the reversely oriented diode D8 are connected in series to the data output signal line TXD while the reversely oriented diode D3, the capacitor C1, and the reversely oriented diode D8 being connected in series to the data terminal ready signal line DTR. The negative voltage of −12 volts from any signal line is stored as an electric charge in the capacitor C1. When the capacitor terminal CAP is connected with the positive voltage input terminal V+, on the contrary, the grounded positive voltage input terminal V+, the capacitor C1, and the forward-directed diode D7 are connected in series to release the electric charge stored in the capacitor C1. Since a negative potential of the capacitor C1 is grounded via the positive voltage input terminal V+, the potential on the diode D7 becomes equal to +12 volts. The DC-DC converter 21 accomplishes such quick switching between these connections to steadily output the constant voltage of +12 volts to the diode D7.

The circuit structure of the DC-DC converter 21 is generally referred to as a positive voltage doubler circuit, where a potential difference between the positive voltage input terminal V+ and the diode D7 is equal to a potential difference between the ground terminal GND and the positive voltage input terminal V+. In case that the positive voltage input terminal V+ is grounded as shown in this embodiment, an output from the diode D7 has an inverse polarity of an input into the ground terminal GND. When the input into the ground terminal GND is −12 volts, the voltage of +12 volts is thereby output from the diode D7. This structure constitutes a second power circuit.

The output of the diode D7 is connected to an input of the voltage regulator 23. The data terminal ready signal line DTR, the data output signal line TXD, and the request-to-send signal line RTS are respectively connected to the input of the voltage regulator 23 via forward-directed (in the from GND line to signal line) diodes D4, D5, and D6 so as to output a voltage of +12 volts. The structure including the diodes D4 through D6 constitutes a first power circuit. The voltage regulator 23 receives the voltage of +12 volts applied at its input terminal and stably outputs a constant voltage of +5 volts, which is supplied to the communication processor 7 and the other logic circuits.

Function of the power unit 10 is described in detail. When the printer 5 sets the data terminal ready signal DTR or the request-to-send signal RTS equal to −12 volts, the voltage of −12 volts is supplied from the data terminal ready signal DTR via the diode D3 or from the request-to-send signal line RTS via the diode D1 to the DC-DC converter 21, which consequently outputs the voltage of +12 volts. The voltage of +12 volts is supplied to the voltage regulator 23, which accordingly generates a constant voltage of +5 volts.

When the printer 5 sets the data terminal ready signal DTR or the request-to-send signal RTS equal to +12 volts, on the other hand, the power unit 10 receives the voltage of +12 volts from the data terminal ready signal line DTR via the diode D4 or from the request-to-send signal line RTS via the diode D6. The voltage of +12 volts is supplied to the voltage regulator 23, which accordingly generates a constant voltage of +5 volts.

Whether the data terminal ready signal DTR or the request-to-send signal RTS is equal to +12 volts or −12 volts, the power unit 10 stably receives the voltage of +12 volts and supplies the voltage to the line driver 11 and the inverter 12. The voltage regulator 23 also receives the voltage of +12 volts and generates the constant voltage of +5 volts, which is supplied to the communication processor 7 and the peripheral logic circuits.

Power supply from the data output signal line TXD is described further referring to FIGS. 1 and 2. The data output signal line TXD varies between −12 volts and +12 volts under conditions of data communication, but is stable at −12 volts under non-communication conditions (mark conditions). When data are transmitted only in one direction from the personal computer 3 to the printer 5 as in this embodiment, the voltage of −12 volts is stably supplied from the data output signal line TXD via the diode D2 to the power unit 10. The DC-DC converter 21 of the power unit 10 then converts −12 volts to +12 volts. The data output signal line TXD is connected to the power unit 10 via the diode D5 as described above. When the data output signal line TXD is set equal to +12 volts (space conditions), the power unit 10 accordingly receives +12 volts as in the case of the data terminal ready signal DTR or the request-to-send signal RTS.

Among the powers thus generated, both the voltages of +12 volts and −12 volts are supplied to the line driver 11. The line driver 11 consumes the maximum power while the personal computer 3 transmits data to the printer 5. During the data transmission from the personal computer 3 to the printer 5, the data output signal line TXD is kept at −12 volts as described previously and the line driver 11 stably receives the voltages of ±12 volts. In this embodiment, the data output signal line TXD does not have a line driver but is directly connected to the CMOS inverter 12. A line driver may be interposed in the data output signal line TXD in an alternative structure where the voltage of −12 volts is effectively stored in a capacitor or a battery.

While the personal computer 3 successively transmits data by hardware handshaking with the data terminal ready signal DTR, when the printer 5 stops receiving data transmitted from the data transfer unit 1, due to paper run-out or another reason, the data terminal ready signal DTR or the request-to-send signal RTS is set equal to −12 volts. In this case, powers of ±12 volts and +5 volts are also generated from the voltage of −12 volts supplied from the data terminal ready signal line DTR or the request-to-send signal line RTS in the same manner as above.

As described above, the data transfer unit 1 of the first embodiment does not require any internal power supply using a battery or a commercial power source, and is thereby designed to be favorably small. The structure using no commercial power source allows the data transfer unit 1 to be installed and connected in an arbitrary manner whereas the structure using no battery does not require charging or replacement of the battery.

In this embodiment, the line driver 11 is used exclusively for the data input signal line RXD while the data output signal line TXD is connected to the inverter 12. This structure requires the voltage of −12 volts only for the line driver 11 and efficiently saves the power. The diodes D2 and D5 are connected to the data output signal line TXD of the inverter 12 to prevent a negative or positive overvoltage and protect the inverter 12. The other diodes D1 and D6 connected to the request-to-send signal line RTS and D3 and D4 connected to the data terminal ready signal line DTR have similar functions and effects.

Figure 3:
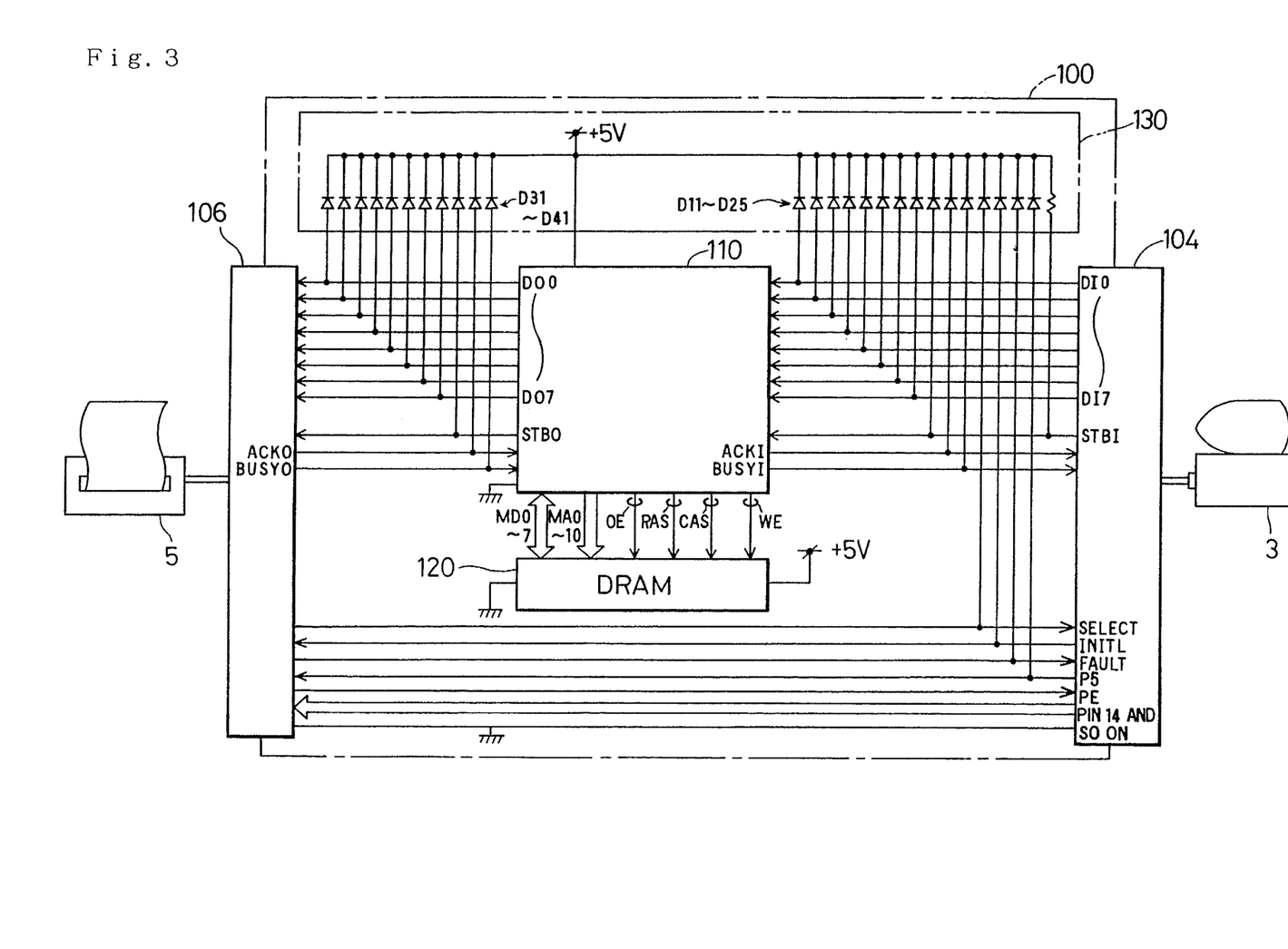
FIG. 3 is a block diagram schematically showing a structure of a printer buffer having a data transfer unit according to a second embodiment of the invention.

Another data transfer unit is described as a second embodiment of the invention according to the block diagram of FIG. 3.

Referring to FIG. 3, a data transfer unit 100 interposed between a personal computer 3 and a printer 5 functions as a printer buffer, which receives and stores parallel data output from the personal computer 3 and sends the stored parallel data to the printer 5. Data exchange between the personal computer 3 and the data transfer unit 100 and between the data transfer unit 100 and the printer 5 is attained through parallel communications in conformity with a Centronics standard.

The data transfer unit 100 includes a buffer controller 110, a volatile storage element DRAM (dynamic random access memory) 120, and a power unit 130. The buffer controller 110 is a one-chip microcomputer for controlling the timing of sending or receiving parallel data from or to the personal computer 3 and the printer 5 and reading and writing data out of and into the DRAM 120. The buffer controller 110 is connected to the personal computer 3 via a first connector 104 by data buses DI0 through DI7, a data strobe signal line STBI, an acknowledge signal line ACKI, and a busy signal line BUSYI. The buffer controller 110 is further connected to the printer 5 via a second connector 106 by data buses DO0 through DO7, a data strobe signal line STBO, an acknowledge signal line ACKO, and a busy signal line BUSYO. The buffer controller 110 is also connected to the DRAM 120 by address buses MA0 through MA10, a row address signal line RAS, a column address signal line CAS, a write enable signal line WE, an output enable signal line OE, and 8-bit data buses MD0 through MD7.

The first connector 104 of the data transfer unit 100 connected to the personal computer 3 and the second connector 106 connected to the printer 5 are connected directly with each other by a variety of signal lines including SELECT, INITL, FAULT, P5, and PE signals.

The buffer controller 110 and the DRAM 120 of the data transfer unit 100 require supplying a constant voltage of +5 volts, which is provided from the power unit 130. The power unit 130 receives the constant voltage of +5 volts through a plurality of forward-oriented diodes working as rectifiers and respectively connected to the data buses and the signal lines used for parallel data exchange in the data transfer unit 100. The power unit 130 includes diodes D11 through D25 and D31 through D41 which are respectively connected in a forward direction to the data buses DI0 through DI7, the signal lines STBI, ACKI, and BUSYI used for data exchange between the buffer controller 110 and the personal computer 3, to the signal lines SELECT, INITL, FAULT, and P5 directly connecting the first connector 104 to the second connector 106, to the data buses DO0 through DO7, the signal lines STBO, ACKO, and BUSYO used for data exchange between the buffer controller 110 and the printer 5. The power unit 130 accordingly generates the constant voltage of +5 volts from signals (+5 volts) output from the personal computer 3 and the printer 5 to the corresponding data buses and the signal lines.

All the data buses and the signal lines connected to the diodes are not simultaneously fixed to a low level of 0 volt, and the power unit 130 thereby generates the steady voltage of +5 volts. This allows the constant voltage of +5 volts to be steadily supplied to the buffer controller 110 and the DRAM 120.

The diodes D11 through D25 and D31 through D41 used for the power unit 130 are those of a low-drop type having less voltage drop, for example, MA704WK by Matsushita Electric Industrial Co., Ltd. The buffer controller 110 and the DRAM 120 are preferably of a CMOS type working even at a voltage a little lower than +5 volts. Even when the voltage generated in the power unit 130 becomes lower than +5 volts due to the voltage drop by the diodes, the CMOS-type buffer controller 110 and DRAM 120 allow normal operation of the data transfer unit 100.

As described above, the data transfer unit 100 of the second embodiment does not require any internal power supply using a battery or a commercial power source, and is thereby designed to be sufficiently small for installation between the personal computer 3 and the printer 5. The data transfer unit 100 functions as a printer buffer to shorten an occupation time of the personal computer 3 which is determined by the operation speed of the printer 5.

In the second embodiment, the power unit 130 receives the constant voltage of +5 volts from the data buses and the signal lines used for data exchange between the buffer controller 110 and the personal computer 3 and between the buffer controller 110 and the printer 5 as well as from the signal lines for directly connecting the first connector 104 to the second connector 106. Other structures may, however, be applied to generate the constant voltage of +5 volts. The possible structures include that the power unit 130 receives the constant voltage of +5 volts only from the data buses and the signal lines used for data exchange between the buffer controller 110 and the personal computer 3, that the power unit 130 receives the constant voltage of +5 volts only from the signal lines for directly connecting the first connector 104 to the second connector 106, and that the power unit 130 receives the constant voltage of +5 volts from the data buses and the signal lines which are output from either the personal computer 3 or the printer 5 and not simultaneously fixed at the low level of 0 volt.

In the structure of the second embodiment, the power unit 130 directly receives the constant voltage of +5 volts via the low-drop type diodes D11 through D25 and D31 through D41. A DC-DC converter may, however, be used for converting a constant voltage lower than +5 volts obtained via non-low drop type-diodes to the steady voltage of +5 volts or to a constant voltage other than +5 volts.

Figure 4:
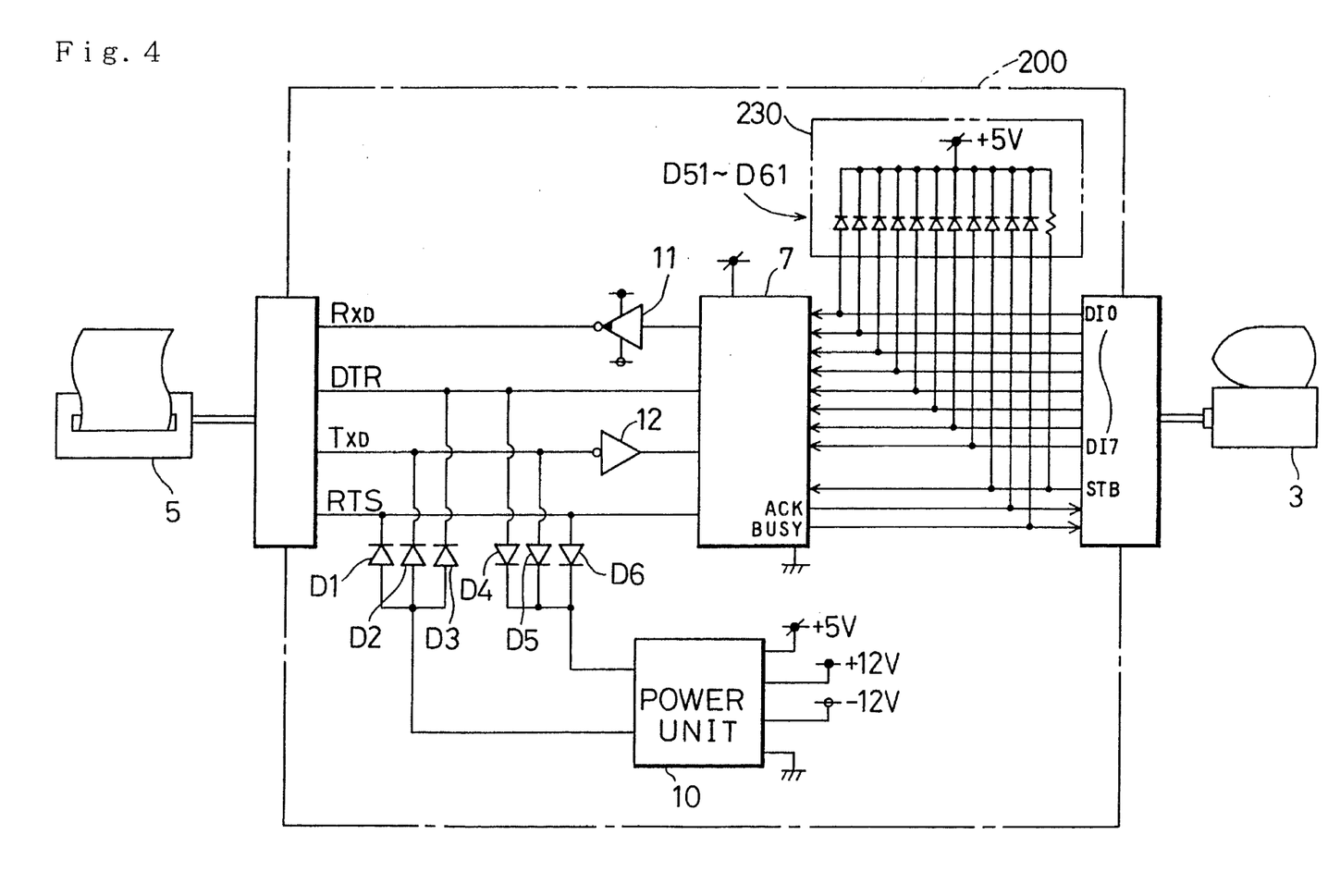
FIG. 4 is a block diagram schematically showing a structure of a data transfer unit according to a third embodiment of the invention.

Still another data transfer unit is described as a third embodiment of the invention according to the block diagram of FIG. 4.

Referring to FIG. 4, a data transfer unit 200 interposed between a personal computer 3 and a printer 5 receives parallel data output from the personal computer 3, converts the parallel data to serial signals, and sends the serial signals to the printer 5. Parallel data exchange between the personal computer 3 and the data transfer unit 200 is attained through parallel communications in conformity with a Centronics standard whereas data exchange between the data transfer unit 200 and the printer 5 is implemented through serial communications in conformity with an RS-232C standard.

The data transfer unit 200 of the third embodiment includes a second power unit 230 for generating a constant voltage of +5 volts in addition to the structure of the data transfer unit 1 of the first embodiment. Elements of the data transfer unit 200 identical with those of the data transfer unit 1 of the first embodiment or those of the data transfer unit 100 of the second embodiment are shown by the same numerals and not described here in detail.

In the data transfer unit 200, constant voltages of +5 volts and ±12 volts are generated by the power unit 10 and the second power unit 230. As described for the data transfer unit 1 of the first embodiment, the power unit 10 generates the constant voltages of +5 volts and ±12 volts from electric currents supplied via diodes D1, D2, and D3 respectively connected in a reverse direction to a request-to-send signal line RTS, a data output signal line TXD, and a data terminal ready signal line DTR output from the printer 5 as well as from electric currents supplied via diodes D5, D6, and D7 respectively connected in a forward direction to RTS, TXD, and DTR.

Like the power unit 130 of the second embodiment, the second power unit 230 generates the constant voltage of +5 volts via diodes D51 through D61 respectively connected in a forward direction to data buses DI0 through DI7 and signal lines STB, ACK, and BUSY connecting a communication processor 7 to the personal computer 3.

The voltages of ±12 volts generated in the power unit 10 are supplied to the line driver 11 while the constant voltage of +5 volts generated in the power unit 10 and the second power unit 230 is supplied to the communication processor 7 and peripheral logic circuits. The communication processor 7 subsequently converts parallel data output from the personal computer 3 to serial data and sends the serial data to the printer 5.

In the data transfer unit 200 of the third embodiment, the constant voltages are generated both from the power unit 10 and the second power unit 230. This allows effective data transmission with sufficient power and enhances the reliability of data transmission. The data transfer unit 200 of the third embodiment requires no internal power supply using a battery or a commercial power source, and is thereby designed to be favorably small.

Figure 5:
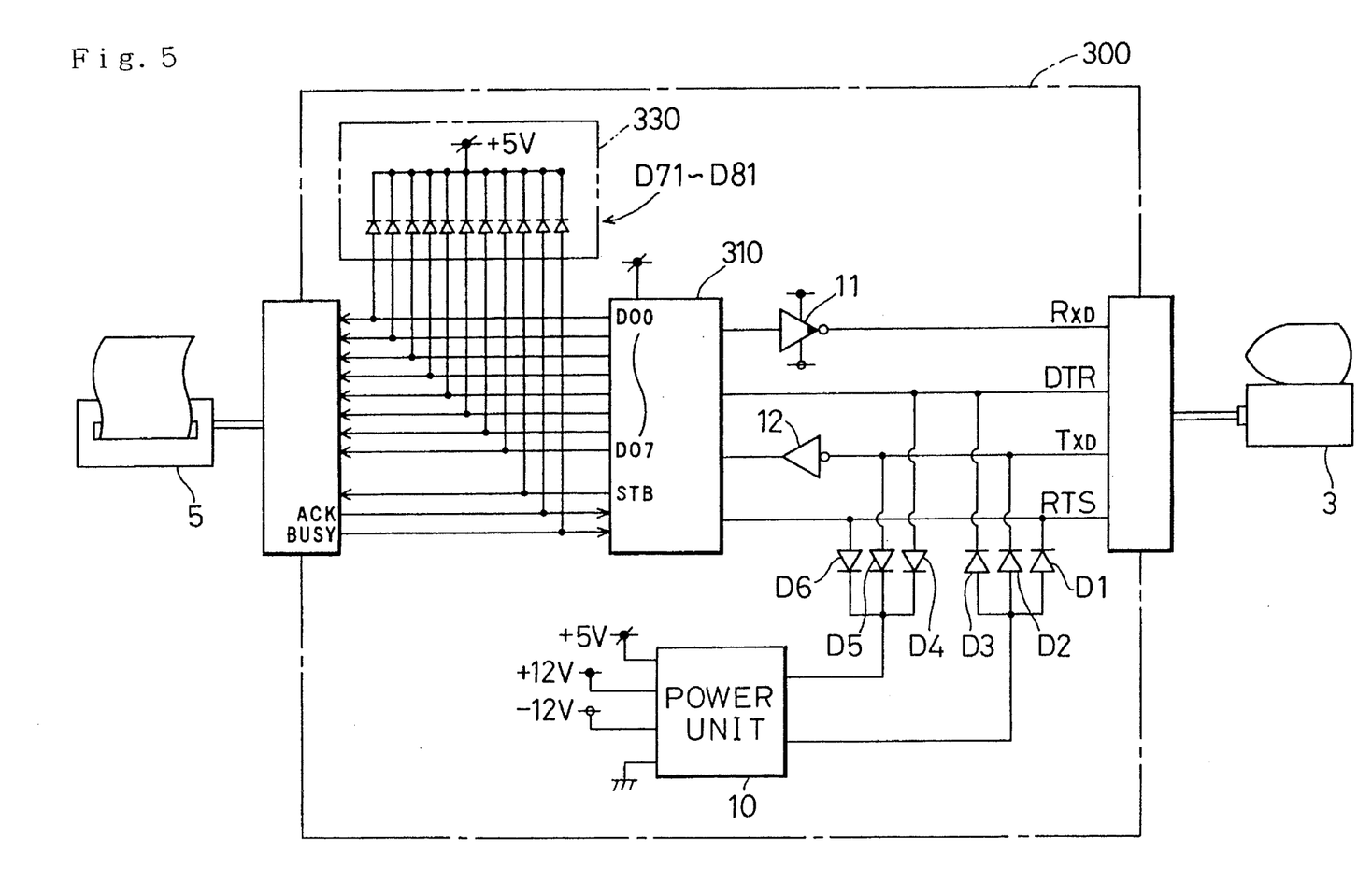
FIG. 5 is a block diagram schematically showing a structure of a data transfer unit according to a fourth embodiment of the invention.

Another data transfer unit is described as a fourth embodiment of the invention according to the block diagram of FIG. 5.

Referring to FIG. 5, a data transfer unit 300 interposed between a personal computer 3 and a printer 5 receives serial signals output from the personal computer 3, converts the serial signals to parallel data, and sends the parallel data to the printer 5. Data exchange between the data transfer unit 300 and the personal computer 3 is implemented through serial communications in conformity with an RS-232C standard whereas parallel data exchange between the data transfer unit 300 and the printer 5 is attained through parallel communications in conformity with a Centronics standard.

The data transfer unit 300 of the fourth embodiment includes a communication processor 310, a power unit 10 and a second power unit 330. The communication processor 310 controls the timing of conversion of serial signals to parallel data and of data exchange with the personal computer 3 for serial signals and with the printer 5 for parallel data.

As described for the data transfer unit 1 of the first embodiment, the power unit 10 generates constant voltages of +5 volts and ±12 volts from electric currents supplied via diodes D1, D2, and D3 respectively connected in a reverse direction to a request-to-send signal line RTS, a data output signal line TXD, and a data terminal ready signal line DTR output from the personal computer 3 as well as from electric currents supplied via diodes D5, D6, and D7 respectively connected in a forward direction to RTS, TXD, and DTR.

Like the power unit 130 of the second embodiment, the second power unit 330 generates the constant voltage of +5 volts via diodes D71 through DS1 respectively connected in a forward direction to data buses DO0 through DO7 and signal lines STB, ACK, and BUSY connecting the communication processor 310 to the printer 5.

The voltages of ±12 volts generated in the power unit 10 are supplied to the line driver 11 while the constant voltage of +5 volts generated in the power unit 10 and the second power unit 330 is supplied to the communication processor 310 and peripheral logic circuits. The communication processor 310 subsequently converts serial signals output from the personal computer 3 to parallel data and sends the parallel data to the printer 5.

In the data transfer unit 300 of the fourth embodiment, the constant voltages are generated both from the power unit 10 and the second power unit 330. This allows effective data transmission with sufficient power and enhances the reliability of data transmission. The data transfer unit 300 requires no internal power supply using a battery or a commercial power source, and is thereby designed to be favorably small.

Although the data transfer unit 300 of the fourth embodiment includes both the power unit 10 and the second power unit 330, the second power unit 330 may be omitted provided that the power unit 10 generates sufficient power.

There may be many modifications, alternations, and changes without departing from the scope or spirit of essential characteristics of the invention. It is thus clearly understood that the above embodiments are only illustrative and not restrictive in any sense. The principle of the present invention may be applicable to another data transfer unit for RS-232C to RS-422 serial-serial data conversion, a structure generating voltages other than +5 volts or +12 volts, or a structure having a capacitor or another storage element for storing ±12 volts.

The scope and spirit of the present invention are limited only by the terms of the appended claims.

What is claimed is:

1. A power supply arrangement for a data transfer unit interposed between two devices for executing data exchange according to a handshaking process based on a signal level, said data transfer unit comprising:

a first power circuit for receiving an electric current via a rectifier connected in a forward direction to a signal line used for handshaking, and generating a predetermined positive voltage;

a second power circuit for receiving an electric current via a rectifier connected in a reverse direction to said signal line used for handshaking, and generating said predetermined positive voltage; and power supply means for supplying outputs of said first power circuit and said second power circuit as power of a logic circuit.

2. A power supply arrangement for a data transfer unit in accordance with claim 1, wherein one of said two devices is a device of parallel data exchange, and the other is a device of serial communications, said data transfer unit receives parallel data output from said device of parallel data exchange, converts said parallel data to serial data, and transmits said serial data to said device of serial communications, said first power circuit further comprising:

a serial power circuit for receiving an electric current via a rectifier connected in a forward direction to a signal line used for handshaking in serial communications, and generating said predetermined positive voltage; and a parallel power circuit for receiving an electric current via a plurality of rectifiers connected in a forward direction to a plurality of data lines used in parallel data exchange, and generating said predetermined positive voltage.

3. A power supply arrangement for a data transfer unit in accordance with claim 1, wherein said devices comprises a device of parallel data exchange and a device of serial communications, said data transfer unit receives serial data output from said device of serial communications, converts said serial data to parallel data, and transmits said parallel data to said device of parallel data exchange, said signal line being used for handshaking in serial communications.

4. A power supply arrangement for a data transfer unit in accordance with claim 1, wherein said devices comprises a device of parallel data exchange and a device of serial communications, said data transfer unit receives serial data output from said device of serial communications, converts said serial data to parallel data, and transmits said parallel data to said device of parallel data exchange, said first power circuit further comprising:

a serial power circuit for receiving an electric current via a rectifier connected in a forward direction to a signal line used for handshaking in serial communications, and generating said predetermined positive voltage; and a parallel power circuit for receiving an electric current via a plurality of rectifiers connected in a forward direction to a plurality of data lines used in parallel data exchange, and generating said predetermined positive voltage.

5. A power supply arrangement for a data transfer unit in accordance with claim 1, wherein one device conducts serial communications, and said signal line is used for handshaking in said serial communications.

6. A power supply arrangement for a data transfer unit in accordance with claim 5, wherein said serial communications are in conformity with an RS-232C standard, said signal line used for handshaking and connected to said first power circuit and said second power circuit via the respective rectifiers comprises a data terminal ready signal line output from said device of serial communications.

7. A power supply arrangement for a data transfer unit in accordance with claim 5, wherein said serial communications are in conformity with an RS-232C standard, said signal line used for handshaking and connected to said first power circuit and said second power circuit via the respective rectifiers comprises a request-to-send signal line output from said device of serial communications.

8. A power supply arrangement for a data transfer unit in accordance with claim 5, wherein said device of serial communications comprises a rectifier oriented in reverse direction from a signal line for output serial data to an input of said second power circuit.

9. A power supply arrangement for a data transfer unit in accordance with claim 5, wherein said serial communications are in conformity with an RS-232C standard, said signal line used for handshaking and connected to said first power circuit and said second power circuit via the respective rectifiers comprises a data terminal ready signal line and a request-to-send signal line output from said device of serial communications, said device of serial communications comprising a rectifier oriented in a reverse direction from a signal line for output serial data to an input of said second power circuit.

10. A power supply arrangement for a data transfer unit in accordance with claim 5, wherein said second power circuit further comprises a capacitor for storing an electric charge in response to a voltage of said signal line used for handshaking, a circuit for inverting a polarity of the electric charge stored in said capacitor and discharging the electric charge with the inverted polarity, and a circuit for switching charge and discharge at short cycles.

11. A power supply arrangement for a data transfer unit in accordance with claim 5, wherein said power supply means further comprises:

logic circuit power supply means for receiving said predetermined positive voltage output from said first power circuit and said second power circuit, and generating a second positive voltage required for said logic circuit to supply said second positive voltage as power of said logic circuit; and driver power supply means for receiving a negative voltage supplied via said rectifier connected in a reverse direction to said signal line used for handshaking and said predetermined positive voltage output from said first power circuit and said second power circuit, and supplying said negative voltage and said predetermined positive voltage as power of a communication driver used for data transmission.

12. A power supply arrangement for a data transfer unit in accordance with claim 5, wherein said devices performs parallel data exchange, said data transfer unit receives parallel data output from said device of parallel data exchange, converts said parallel data to serial data, and transmits said serial data to said device of serial communications.

13. A power supply arrangement for a data transfer unit in accordance with claim 12, wherein said serial communications are in conformity with an RS-232C standard, said signal line connected to said first power circuit and said second power circuit via the respective rectifiers comprises a data terminal ready signal line, a request-to-send signal line, and a data output signal line in said serial communications.

14. A power supply arrangement for a data transfer unit interposed between devices for executing data exchange according to a handshaking process based on a signal level, said data transfer unit comprising:

a power circuit for receiving an electric current via two or more rectifiers respectively connected in a forward direction to two or more signal lines for two or more signals which are output from said devices and not fixed simultaneously at a lower level, and generating a predetermined positive voltage; and power supply means for supplying an output from said power circuit as power of a logic circuit;

where in said logic circuit further comprises input means for receiving data output from a data transmitting device at a timing of said data transmitting device;

storage means for storing said data received by said input means; and output means for sending said stored data to a data receiving device at a timing of said data receiving device.

15. A power supply arrangement for a data transfer unit in accordance with claim 14, wherein said data comprises parallel data.

16. A method of supplying power to a data transfer unit, which is interposed between devices for executing data exchange according to a handshaking process based on a signal level, said method comprising steps of:

receiving an electric current via a rectifier connected in a forward direction to a signal line used for handshaking to generate a predetermined positive voltage;

receiving an electric current via a rectifier connected in a reverse direction to said signal line used for handshaking to generate said predetermined positive voltage; and supplying said predetermined positive voltage as power of a logic circuit used for data transmission.

17. A method of supplying power to a data transfer unit, which receives parallel data output from a device of parallel data exchange, converts said parallel data to serial data, and transmits said serial data to a device of serial communications, said method comprising steps of:

receiving an electric current via a rectifier connected in a forward direction to a signal line output from said device of serial communications to generate a predetermined positive voltage;

receiving an electric current via a rectifier connected in a reverse direction to said signal line output from said device of serial communications to generate said predetermined positive voltage; and supplying said predetermined positive voltage as power of a logic circuit used for data conversion and transmission.

18. A data transfer unit interposed between a crevice of parallel data exchange and a device of serial communications, said data transfer unit being used for transferring data transmitted from one of said devices to the other, said data transfer unit comprising:

a first power circuit for receiving an electric current via a rectifier connected in a forward direction to a signal line used for handshaking, and generating a predetermined positive voltage;

a second power circuit for receiving an electric current via a rectifier connected in a reverse direction to said signal line used for handshaking, and generating said predetermined positive voltage; and a transfer circuit which receives said predetermined positive voltage generated from said first and second power circuits as power, said transfer circuit being used for receiving data transmitted from said one device in accordance with transmission timing of said one device and converting received data to a specific format of data exchanged by the other one of said devices to send converted data to the other device.

19. A data transfer unit in accordance with claim 18, wherein said one device conducts serial communications and the other device performs parallel data exchange.

20. A data transfer unit in accordance with claim 19, wherein said first power circuit comprises:

a serial power circuit for receiving an electric current via a rectifier connected in a forward direction to a signal line used for handshaking in serial communications, and generating said predetermined positive voltage; and a parallel power circuit for receiving an electric current via a plurality of rectifiers connected in a forward direction to a plurality of data lines used in parallel data exchange, and generating said predetermined positive voltage.

21. A data transfer unit in accordance with claim 18, wherein said one device performs parallel data exchange and the other device conducts serial communications.

22. A data transfer unit in accordance with claim 21, wherein said serial communications are in conformity with an RS-232C standard, said signal line connected to said first power circuit and said second power circuit via the respective rectifiers comprises a data terminal ready signal line, a request-to-send signal line, and a data output signal line in conformity with said RS-232C standard.

23. A data transfer unit in accordance with claim 21, wherein said first power circuit comprises:

a serial power circuit for receiving an electric current via a rectifier connected in a forward direction to a signal line used for handshaking in serial communications, and generating said predetermined positive voltage; and a parallel power circuit for receiving an electric current via a plurality of rectifiers connected in a forward direction to a plurality of data lines used in parallel data exchange, and generating said predetermined positive voltage.

24. A data transfer unit interposed between two devices for executing data exchange with handshaking based on a signal level, said data transfer unit being used for transferring data transmitted from one of said two devices to the other said data transfer unit comprising:

a power circuit for receiving an electric current via two or more rectifiers respectively connected in a forward direction to two or more signal lines which are connected to said two devices and not fixed simultaneously at a lower level, and generating a predetermined positive voltage;

a semiconductor storage medium which receives said predetermined positive voltage generated from said power circuit as power, and is capable of reading and writing data; and a transmit-receive circuit which receives said predetermined positive voltage generated from said power circuit as power, said transmit-receive circuit being used for receiving data transmitted from said one device in accordance with transmission timing of said one device, writing said received data into said semi conductor storage medium and sending said data written into said semi conductor storage medium to the other device.

25. A data transfer unit in accordance with claim 24, wherein said data comprises parallel data.

* * * * *